US005787455A

United States Patent [19]
Seybold

[11] Patent Number: 5,787,455
[45] Date of Patent: Jul. 28, 1998

[54] METHOD AND APPARATUS FOR STORING CORRECTED WORDS WITH PREVIOUS USER-CORRECTED RECOGNITION RESULTS TO IMPROVE RECOGNITION

[75] Inventor: John Lome Campbell Seybold, Palo Alto, Calif.

[73] Assignee: Motorola, Inc., Schaumburg, Ill.

[21] Appl. No.: 579,957

[22] Filed: Dec. 28, 1995

[51] Int. Cl.[6] .................. G06F 12/00; G06K 9/00
[52] U.S. Cl. .................. 711/100; 711/3; 711/100; 382/188; 382/189; 382/217
[58] Field of Search .................. 382/185, 188–189, 382/214–217; 395/446; 711/3, 119, 147, 100; 364/DIG. 2, 243.4

[56] References Cited

U.S. PATENT DOCUMENTS

| | | | |
|---|---|---|---|
| 4,297,528 | 10/1981 | Beno | 704/244 |
| 4,953,225 | 8/1990 | Togawa et al. | 382/179 |
| 4,955,060 | 9/1990 | Katsuki et al. | 382/212 |
| 4,972,496 | 11/1990 | Sklarew | 382/187 |
| 5,020,117 | 5/1991 | Ooi et al. | 382/185 |
| 5,054,104 | 10/1991 | Yamaguchi | 382/57 |
| 5,204,914 | 4/1993 | Mason et al. | 382/161 |
| 5,285,505 | 2/1994 | Kim et al. | 382/161 |
| 5,289,275 | 2/1994 | Ishii et al. | 348/154 |
| 5,399,874 | 3/1995 | Gonsalves et al. | 250/556 |
| 5,454,046 | 9/1995 | Carman II | 382/186 |
| 5,544,260 | 8/1996 | Chefalas et al. | 382/187 |
| 5,550,930 | 8/1996 | Beman et al. | 382/187 |
| 5,563,964 | 10/1996 | Tanaka et al. | 382/292 |

*Primary Examiner*—Tod R. Swann
*Assistant Examiner*—Tuan V. Thai
*Attorney, Agent, or Firm*—Terri S. Hughes

[57] ABSTRACT

A cache is used to provide additional information to a recognition system about what words are likely to be used in a current context. Words are added to the cache only if they are explicitly corrected by the user. If the user forgets to correct (or postpones correcting) a recognition error, nothing is added to the cache, and therefore, there is no negative impact on the recognition system.

14 Claims, 2 Drawing Sheets

METHOD AND APPARATUS FOR STORING CORRECTED WORDS WITH PREVIOUS USER-CORRECTED RECOGNITION RESULTS TO IMPROVE RECOGNITION

Field of the Invention

This invention relates generally to recognition of natural human input such as handwriting and speech, and more particularly to a recognition enhancement techniques for correctly recognizing natural human input.

Background of the Invention

Computer recognition of natural inputs, such as human speech and handwriting is a difficult problem, and all techniques known to date are prone to making recognition errors. One technique that advanced recognition programs have used in an attempt to reduce the occurrence of errors is to automatically maintain a short history of words (commonly referred to by those skilled in the art as a cache) generated as the user is writing (or speaking). Such previous cache techniques have suffered from the problem that incorrect responses may be added to the cache if, for example, the user or the system fails to correct a translation error in a timely manner. This results in cache instability in that once a few incorrect entries to the cache have been made, they begin to interfere with the correct response of the recognition system. Generally, once the cache becomes unstable, the overall recognition performance deteriorates to the point where the potential benefits of originally including the cache are exceeded by the recognition errors introduced by the corrupted cache.

Accordingly, a need exists for a recognition enhancement technique resistant to the instabilities and detriments of prior cache attempts.

Description of a Preferred Embodiment

A preferred embodiment of the present invention employs a supplemental list of words in addition to conventional recognition data (referred to as templates by those skilled in the art) to improve the performance of a recognition system. This list of words, which will be referred to herein as a previous user-corrected recognition results, is used by the present invention to provide additional information to the recognition system about what words are likely to be used in the current context. It can also be used to correct repetitive errors made by the system. This can be done by identifying the persistent error and using that knowledge to increase the probability of generating the correct response. According to the present invention, words are added to the previous user-corrected recognition results only if they are explicitly corrected by the user. This technique makes the present invention more robust than previous cache attempts to enhance recognition accuracy. This way, if the user forgets to correct (or postpones correcting) a recognition error, nothing is added to the previous user-corrected recognition results, and therefore, there is no negative impact on the recognition system.

Figure 1:
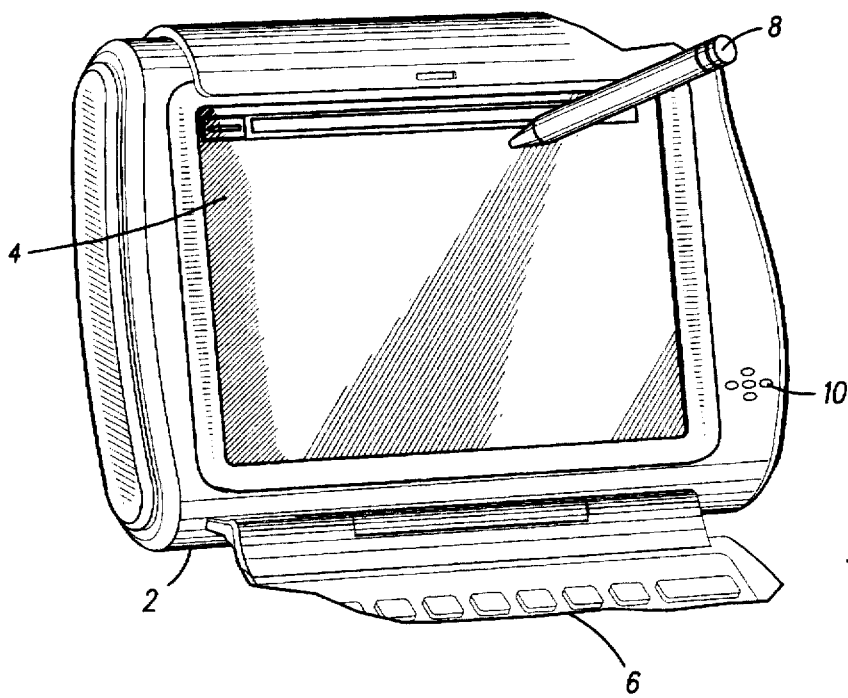
FIG. 1 is a perspective view of a computing device in accordance with the present invention.
Figure 2:
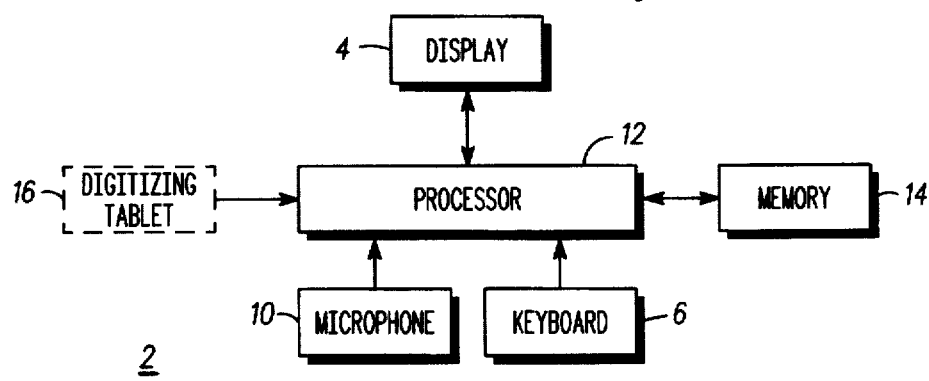
FIG. 2 is an exemplary block diagram of the computing device of FIG. 1.

FIG. 1 and FIG. 2 illustrate a computing device 2 suitable for use with the present invention. The computer device 2 may be, for example, a Thinkpad lap-top type computer made by IBM. Alternately, a personal digital assistant, such as the Newton manufactured by Apple Computer, or the Envoy wireless communicator, made by Motorola, or similar computing devices could be employed with the present invention. As shown in FIG. 1, the computing device 2 includes a digitizing display 4 that may be used as an alternate to the keyboard 6 to input information by using a stylus 8 to select functions, enter instructions, or handwritten text, graphics, or other information onto the display 4. The computing device 2 also includes a microphone 10, for receiving and digitizing spoken commands, instructions, or user input via known techniques.

As is known, contemporary computing devices typically include a processing component 12 such as a microprocessor or digital signal processor that, together with other general circuitry, execute the instructions of one or more software programs residing in a memory 14 that may include an operating system to control the functionality and operation of the computing device 2. Optionally, a conventional digitizing tablet 16 may be used to enter printed or handwritten words or text allowing a conventional (non-digitizing or non-touch sensitive) display to be employed for the display 4.

Figure 3:
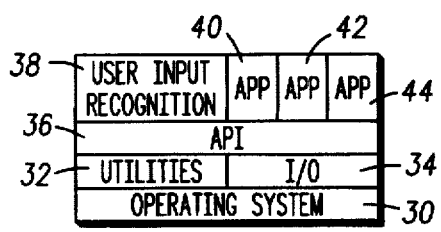
FIG. 3 is a graphic diagram illustrating an exemplary software program configuration of the device of FIG. 1 in accordance with the present invention.
Figure 4:
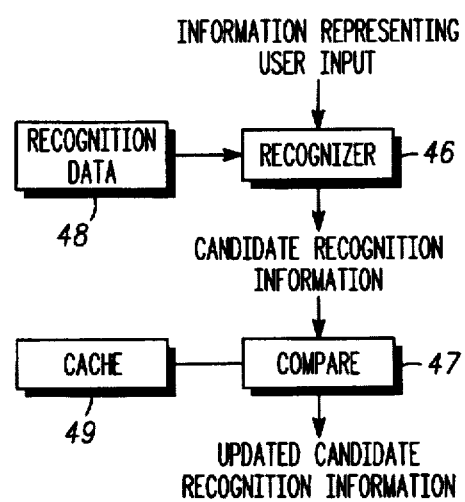
FIG. 4 is a block diagram of the exemplary recognition program of FIG. 3 that may be used in accordance with the present invention.

FIG. 3 illustrates a software program arrangement in accordance with the present invention to enable the computing device 2 of FIG. 1 to utilize the present invention. Overall control of the computing device is governed by an operating system 30. Typical operating systems includes utility programs 32 and input/output (I/O) 34 control, and generally interfaces with other software programs (38–44) via an application programming interface (API) 36. In the preferred embodiment of the present invention a software program 38 for recognizing natural user input resides above the API layer and includes instructions and data to implement speech, printing, or cursive handwriting recognition.

The environment of the present invention can be understood with reference to FIG. 1, FIG. 2, FIG. 3, and FIG. 4 in that a user could handwrite text (for example) onto the display 4 via the stylus 8. Typically, the user's handwritten input is electronically displayed (which is referred to by those skilled in the art as "ink") in the window 18 (which in this example is associated with a handwriting recognition program). The I/O control portion 34 of the operating system 30 digitizes the handwriting (ink) via known techniques and sends information representing the handwritten input to the handwriting recognition program 38 via the API 36. Executing the instructions of the user input recognition program 38 (for example, the Lexicus Longhand cursive handwriting recognition program or the QuickPrint print recognition program, both by the Lexicus Division of Motorola), the computing device 2 performs the functionality of any known handwriting recognition engine 46 and operates to compare the information representing the handwritten input with stored recognition data 48. The output of the recognition engine 46 is a list of candidate recognition information that preferably has a probability value (or score) associated therewith representing the likelihood of correctly replicating the handwritten input as typewritten text. Optionally, the list of candidate recognition information could be ordered such that the position of any particular word in the candidate recognition information represented it likelihood of being correct. In any event, the candidate recognition information is compared (47) with the data stored in a previous user-corrected recognition results 49, and if a match or correspondence is found, that entry in the candidate recognition information has a higher probability of being correct and its value (score) or position in the list is enhanced to reflect this increased likelihood. The candidate recognition information being most likely to be correct, is presented to the user (on display 4) as the recognized text.

In a preferred embodiment, the previous user-corrected recognition results is stored internally in memory (14 in FIG. 2) as a data (or "hash") table. Other possible data structures that may be used as embodiments include binary trees or linked lists. The use of a data table or binary tree permits rapid searching of the previous user-corrected recognition results for efficiency, and will be immediately apparent to one skilled in the art of software development.

Conversely, if the recognized text contains errors, an editing mode is provided so that the user may correct the errors, upon which correction, the present invention operates to add the corrected word or character to the previous user-corrected recognition results as hereinafter described. When the recognized text is correct, it may be transferred, passed, or sent from the recognition program 38 to one of the other application programs (such as a word processing program) 34-38. While the foregoing has been described in the context of handwriting recognition it will be apparent to those skilled in the art that a speech recognition program could be used as the user input recognition program 38.

Figure 5:
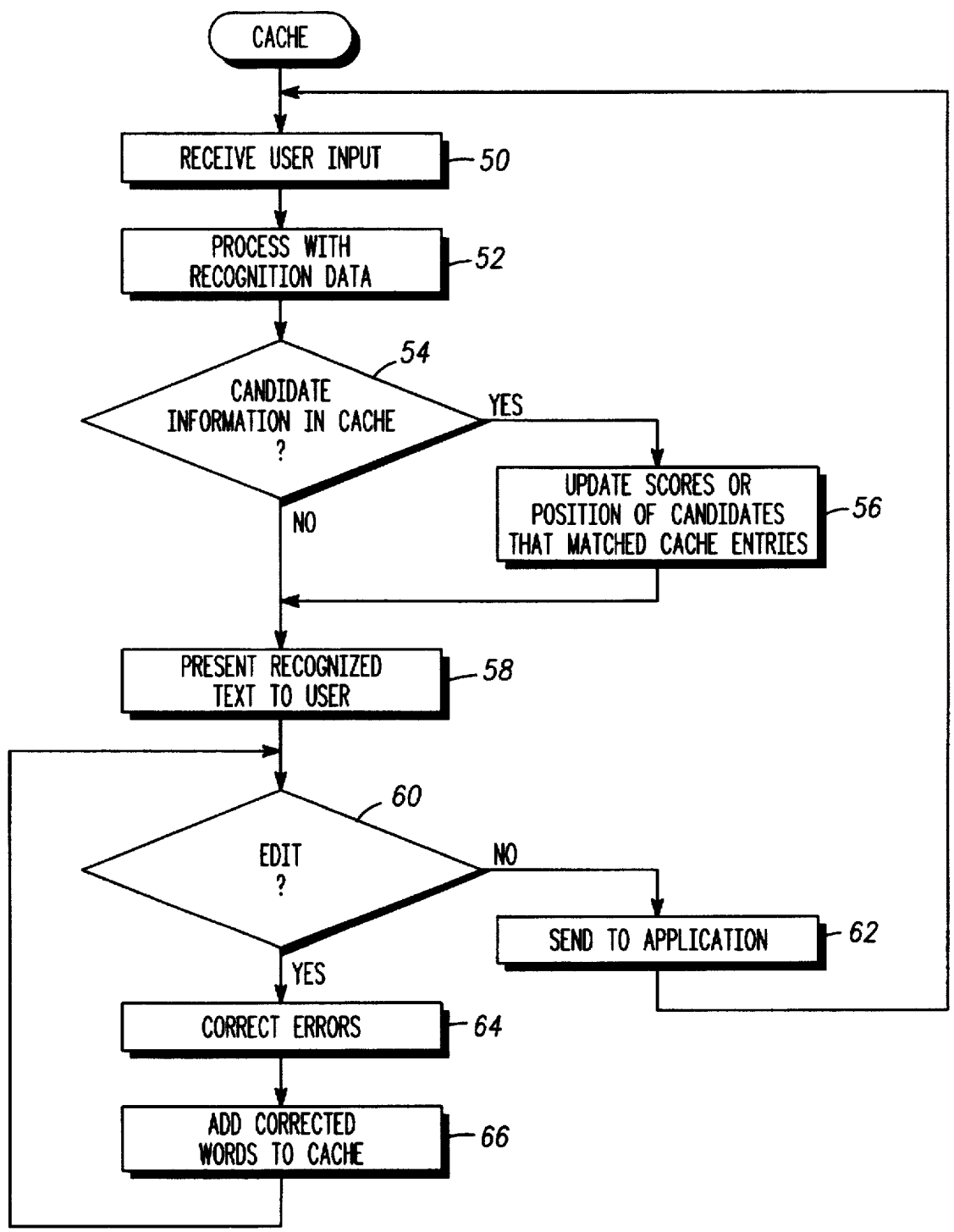
FIG. 5 is a flow diagram illustrating the preferred method in accordance with the present invention.

FIG. 5 is a flow diagram illustrating the operation of the present invention. In step 50, information representing user input is received preferably in the form of digitized handwriting from the display 4 or digitized speech from the microphone 10 of the computing device 2 shown if FIG. 1. The information representing the user input is compared in step 52 to the stored recognition data to provide candidate recognition information in any manner known in the art. Decision 54 examines the previous user-corrected recognition results to determine whether words or characters in the candidate recognition information reside in the previous user-corrected recognition results. If some correlation (or comparative match) is found between some of the candidate recognition information and the words in the previous user-corrected recognition results, the likelihood score or position indicating correctness of the candidate recognition information is updated in step 56.

In the preferred embodiment of the present invention, each candidate recognition information has an associated value (or score) that represents the probability that the word correctly corresponds to the user input. Each of the candidate recognition information is compared against the contents of the previous user-corrected recognition results, and if it is present in the previous user-corrected recognition results, its score is increased (updated in step 56). Preferably, the amount by which the score is increased depends on the number of times the word has been found (or entered as described below) in the previous uses-corrected recognition results. Words which are more frequently found, in this embodiment, thus have a higher chance of being produced as the correct response. Once all of the words in the candidate list provided by the recognition system (46 in FIG. 4) have been compared against the previous user-corrected recognition results, and their scores adjusted accordingly, the most likely candidate is presented to the user as the recognized text (step 58), while the remaining entries in the candidate recognition information are stored for use in an editing mode as alternative choices should the recognized text contain errors.

In an alternate embodiment, the invention would work without scores and the candidate recognition information elements would be ordered (listed) in terms of probability of the candidate text being correct; the appearance of a candidate in the previous user-corrected recognition results could allow that word to move up a certain number of positions in the candidate recognition information list to be updated in step 56.

Step 58 presents the most likely response as recognized text to the user, for example, via the display 4 of the computing device 2 shown if FIG. 1. Occasionally, the recognized text comprises an errored representation of the user input. This may be due to poor handwriting or background noise corrupting the speech signal. It is therefore common to edit the recognized errors in an editing mode provided in the handwriting recognition program. Decision 60 determines whether user instructions or commands have been received to edit and correct errored recognized text. If not, the text preferably is transferred, passed, or sent in step 62 from the recognition program 38 to one of the other application programs (such as a word processing program) 40-42. An affirmative determination of decision 60 causes an editing mode to be entered and any errors in the typewritten replication of the user input to be corrected (step 64). Editing can be done using any known technique and may involve presenting to the user the remaining candidate recognition information as alternate choices and/or providing the user an interface to re-write the word to be recognized again.

Regardless of the editing mode employed, the corrected words are added to the previous user-corrected recognition results in step 66. According to the present invention, words are added to the previous user-corrected recognition results (step 66) only if they are explicitly corrected by the user (step 64). The new word (the correction) is added to the previous user-corrected recognition results. This technique affords the present invention with an advantage in that is much more robust than previous user-corrected recognition results approaches. If the user forgets to correct a mistake, nothing is added to the previous user-corrected recognition results. Therefore, there is no negative impact on the recognition system.

Words may be removed from the previous user-corrected recognition results in different ways in accordance with the invention. In one embodiment, words remain in the previous user-corrected recognition results forever, providing a record of errors made by the recognition system and gradually allowing it to improve its performance over the long term. In another embodiment, words are removed after a predefined (or user selectable) time period has elapsed. This allows the words to have an impact for a definite period of time, such as a business trip, a telephone call, a billing period, etc. In a third embodiment, words are removed in the order they were entered in a first-in-first-out type arrangement; the previous user-corrected recognition results is kept at a constant size, and as each new word is added, the oldest word is discarded.

Accordingly, the present invention provides a recognition enhancement technique that avoids negative affects on recognition accuracy.

What is claimed is:

1. A method, comprising the steps of:

comparing information representing user input with a first set of recognition data;

generating a list of candidate recognition results based on the step of comparing information representing user input with the first set of recognition data, wherein each candidate recognition result in the list has an associated value representing a likelihood of the candidate recognition result correctly replicating the user input as typewritten text;

comparing each candidate recognition result in the list with a second set of recognition data, wherein the second set of recognition data represents previous user-corrected recognition results explicitly corrected by a user;

enhancing the associated value for a candidate recognition result when the candidate recognition result is found in the second set of recognition data to reflect a higher likelihood of the candidate recognition result correctly replicating the user input;

presenting to the user the candidate recognition result that has a highest likelihood of correctly replicating the user input;

processing the candidate recognition result with user instructions to modify it least a portion of the candidate recognition result that has the highest likelihood of correctly replicating the user input to generate a user-corrected recognition result; and adding the user-corrected recognition result to the second set of recognition data, wherein the user-corrected recognition result is used for later comparison with subsequent lists of recognition results.

2. The method of claim 1 further comprising deleting certain data from the second set of recognition data responsive to an addition of new data.

3. The method of claim 1 further comprising deleting certain data from the second set of recognition data at a conclusion of a time interval.

4. The method of claim 1 wherein the associated value is enhanced based on a number of times the candidate recognition result is found in the second set of recognition data.

5. The method of claim 1 wherein the value is a position of the candidate recognition result in the list.

6. The method of claim 1 further comprising:

presenting to the user a remainder of candidate recognition results in the list that were not presented to the user as the candidate recognition result with the highest likelihood of correctly replicating the user input as alternative choices; and providing the user an opportunity to correct the candidate recognition result that has the highest likelihood of correctly replicating the user input.

7. The method of claim 1 wherein the user modifies the candidate recognition result that has the highest likelihood of correctly replicating the user input by re-writing the user input.

8. A device, comprising:

a digitizing input device for receiving user input and for providing information representing the user input;

a display for displaying the user input;

a memory having an operating system and application programs stored therein, including recognition instructions, a first set of recognition data and a second set of recognition data; and digital processing circuitry including a programmable digital processing device capable of processing the recognition instructions in accordance with the operating system to:

compare the information representing the user input with the first set of recognition data;

generate a list of candidate recognition results based on comparing information representing the user input with the first set of recognition data, wherein each candidate recognition result in the list has an associated having a value representing a likelihood of the candidate recognition result correctly replicating the user input as typewritten text;

compare each candidate recognition result in the list with the second set of recognition data, wherein the second set of recognition data represents previous user-corrected recognition results;

enhance the associated value for a candidate recognition result when the candidate recognition result is found in the second set of recognition data to reflect a higher likelihood of correctly replicating the user input;

present to a user the candidate recognition result that has a highest likelihood of correctly replicating the user input;

implement user instructions to modify at least a portion of the candidate recognition result that has the highest likelihood of correctly replicating the user input to generate a user-corrected recognition result; and add the user-corrected recognition result to the second set of recognition data, wherein the user-corrected recognition result is used for later comparison with subsequent lists of recognition results.

9. The device of claim 8, wherein the digital processing circuitry is further programmed to delete from the memory certain data in the second set of recognition data responsive to the addition of new data.

10. The device of claim 8 further comprising a timer and wherein the digital processing circuitry is further programmed to delete from the memory certain data in the second set of recognition data responsive to the timer indicating a conclusion of a time interval.

11. The device of claim 8, wherein the digitizing input device and the display comprise a touch-sensitive display.

12. The device of claim 8 wherein the user modifies the candidate recognition result that has the highest likelihood of correctly replicating the user input by re-writing the user input.

13. The device of claim 8 wherein the associated value is enhanced based on a number of times the candidate recognition result is found in the second set of recognition data.

14. The device of claim 8 wherein the value is a position of the candidate recognition result in the list.

* * * * *